Figures 1, 2:
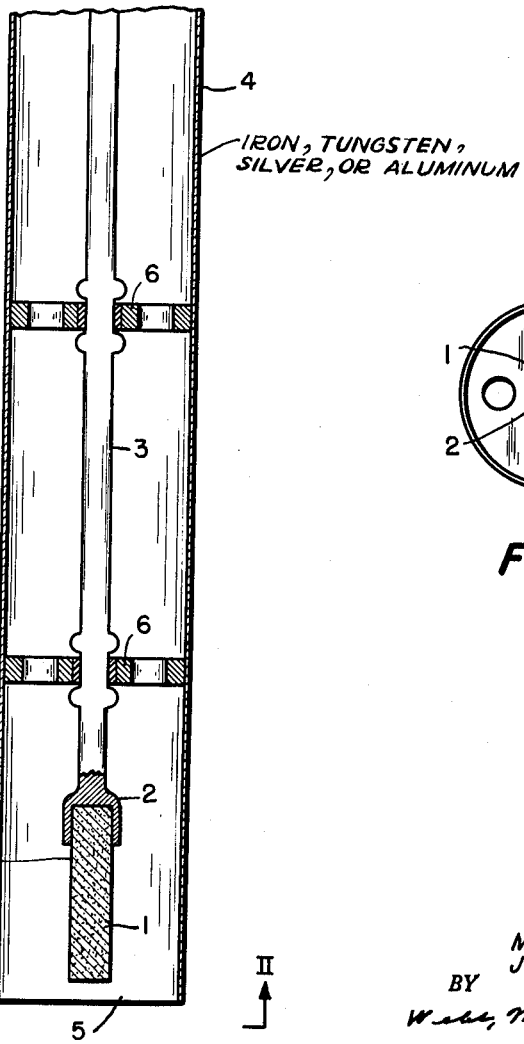

July 21, 1964

M. ROLIN ETAL 3,141,835

METHOD AND APPARATUS FOR DETERMINING OXYGEN
IN A MOLTEN HALOGENATED BATH

Filed Feb. 2, 1961

INVENTORS
Maurice Rolin
Jean-Jacques Gallay
BY

THEIR ATTORNEYS

United States Patent Office 3,141,835
Patented July 21, 1964

3,141,835
METHOD AND APPARATUS FOR DETERMINING OXYGEN IN A MOLTEN HALOGENATED BATH
Maurice Rolin, Caluire, Rhone, and Jean-Jacques Gallay, Scionzier, Haute-Savoie, France, assignors to Societe d'Electro-Chimie d'Electro-Metallurgie et des Acieries Electriques d'Ugine, Paris, France, a corporation of France
Filed Feb. 2, 1961, Ser. No. 86,677
Claims priority, application France Feb. 5, 1960
10 Claims. (Cl. 204—1)

This invention relates to a method and apparatus for determining oxygen in a molten halogenated bath. Molten halogenated baths are of high industrial importance. They sometimes contain oxygenated compounds whose concentration varies in the course of the process to which they are subjected. However, the present methods of regulating the amounts of oxygenated compounds do not permit a continuous recording of the variations of these compounds.

It is known that an electrode indicating a determined ion is an electrode the electric potential of which is related to the activity of this ion in a solution. The applicants discovered that oxygenated compounds dissolved in molten halides are ionized. They considered the electrochemical methods which enable a continuous recording of the oxygen ion content in aqueous media. They concluded that an oxygen indicating electrode dipped into a molten halogenated bath containing oxygen ions would take, in comparison with the molten bath, a potential related directly to the activity of these ions.

In the accompanying drawings, which illustrate a preferred embodiment of the invention:

FIGURE 1 is a diagrammatic elevation, parts being shown in cross section, of a measuring electrode system made according to the invention; and FIGURE 2 is a view taken on the line II—II of FIGURE 1.

The present invention includes:

(a) The use of the electrochemical method of regulating the oxygen ions in aqueous media for recording and regulating oxygen or oxygenated compounds contained in molten halogenated baths.

(b) The use as indicating electrode of any metallic oxide which is thermally stable at the considered temperature and which is practically insoluble in the molten halogenated bath.

The oxides $SnO_2$, $ThO_2$, $Cr_2O_3$, $Fe_2O_3$ and $Fe_3O_4$ fulfill these two conditions in molten fluoride baths and in molten iodide, bromide and chloride baths.

According to the invention, the measurement of the electric potential of one of these insoluble oxides acting as an indicating electrode is made in comparison with another electrode acting as a reference electrode, the reference electrode being insensitive to the action of oxygen in the bath. Either the silver reference electrode described in applicants' French Patent No. 1,233,024, filed April 27, 1959, or a metal such as tungsten, iron or aluminum can be used as the reference electrode. If an indicating electrode and a reference electrode are dipped simultaneously into a molten halogenated bath, a voltaic pile is formed, the electromotive force of which represents the electric potential to be measured. This electromotive force may be recorded in any usual way and its variations depend on the activity of the oxygen ions in the bath.

As illustrative of one embodiment of the invention, the measuring electrode system may comprise an indicating electrode made of one of the oxides described above, in sintered or powdered form, and a reference electrode made of silver.

A particularly useful application of the invention is in the recording and regulation of alumina dissolved in molten cryolite. It is known that in the fluorinated baths used for the electrolytic production of aluminum, alumina is the sole oxygenated compound. Consequently, if one determines in advance the relation between the concentration of the dissolved alumina and the electromotive force of a measuring electrode system as described above, it will be possible, by recording the electromotive force of such a system employed in an industrial electrolytic furnace, to know at each moment the content of alumina in the bath.

The applicants have determined the relation between the concentration of alumina dissolved in the molten cryolite and the electromotive force of a measuring electrode system constituted by a $SnO_2$ rod sintered at 1200° C. and a tungsten wire, both dipped into a molten cryolite bath having a temperature of 1010° C. They found that the electromotive force of such a system is about 660 to 780 mv., depending upon the concentration of alumina in the bath. For a given concentration of alumina, this electromotive force reaches a well determined value after a few minutes which is necessary for reaching equilibrium. When the alumina content varies from 0 to 11%, the electromotive force values vary over a range of about 120 mv. They are reproducible within a range of about 10 mv.

If the tungsten wire is replaced by a wire of pure iron, the same electromotive force variations with respect to the alumina content are obtained and the same reproducibility is obtained except that the electromotive force of the new measuring electrode system varies between 820 and 940 mv.

Referring now to the accompanying drawings, which illustrate a measuring electrode system according to the invention, the oxygen indicating electrode 1 is a sintered oxide rod, for example $SnO_2$ or $Cr_2O_3$. This rod is fixed at its upper end to the lower end 2 of a metal tube 3 made of a nickel base alloy such, for example, as the nickel base alloys sold under the trade names "Inconel," "Hastelloy N," "Nichrome," or "QA 18." A tube 4 of pure iron, which is open at its bottom 5, protects the rod 1 and tube 3, the tube 4 acting at the same time as a reference electrode. The parts are held together by drilled insulating spacers 6 made of boron nitride and by a steatite insulating stopper 7. Wires 8 and 9 may be connected respectively to the tubes 3 and 4, these wires being connected to a suitable recording device, not shown, for indicating the electric potential. In use, the measuring electrode system is dipped into the molten halogenated bath contained in an industrial electrolytic furnace and the wires 8 and 9 are connected with the measuring and recording circuit.

The invention is not limited to the preferred embodiment, but may be otherwise embodied or practiced within the scope of the following claims.

We claim:

1. A measuring system for use in determining oxygen ion concentration in a bath constituted by molten halogenated salts in which oxygenated products are dissolved, which comprises a reference electrode whose electric potential is independent of oxygen ion concentration in the bath, said bath and an indicating electrode whose electric potential is dependent on the oxygen ion concentration in the bath and is thermally stable and practically insoluble in the bath, said indicating electrode consisting of a metallic oxide, said reference and said indicating electrodes being spaced apart and being dipped into said bath, said system measuring electric potential between said electrodes which potential has a magnitude dependent upon oxygen ion concentration in said bath and which is measured to determine oxygen ion concentration in said bath.

2. A method of determining oxygen ion concentration in a bath constituted by molten halogenated salts in which oxygenated products are dissolved, which comprises dipping two spaced apart electrodes into said bath and measuring the difference in electric potential between said two electrodes dipped into said bath, one of said electrodes being a reference electrode whose electric potential is independent of oxygen ion concentration in the bath and the other of said electrodes consisting of a metallic oxide and being an indicating electrode whose electric potential is dependent on the oxygen ion concentration in the bath and is thermally stable and practically insoluble in the bath, said difference in electric potential between said two electrodes having a magnitude dependent upon oxygen ion concentration in said bath.

3. A method of determining the amount of alumina dissolved in a molten cryolite bath, which comprises dipping two spaced apart electrodes into said bath and measuring the difference in electric potential between said two electrodes dipped into said bath, one of said electrodes being a reference electrode whose electric potential is independent of the oxygen ion concentration in the bath, the other of said electrodes consisting of a metallic oxide and being an indicating electrode whose electric potential is dependent on the oxygen ion concentration in the bath and is thermally stable and practically insoluble in the bath, said difference in electric potential between said two electrodes having a magnitude dependent upon oxygen ion concentration in said bath.

4. In a process for electrolytic production of aluminum from a molten cryolite bath containing dissolved alumina, the invention comprising determining the amount of alumina dissolved in said bath by dipping two spaced apart electrodes into said bath and measuring substantially continuously the difference in electric potential between said two electrodes dipped into said bath, one of said electrodes being a reference electrode whose electric potential is independent of the oxygen ion concentration in the bath, the other of said electrodes consisting of a metallic oxide and being an indicating electrode whose electric potential is dependent on the oxygen ion concentration in the bath and is thermally stable and practically insoluble in the bath, said difference in electric potential between said two electrodes having a magnitude dependent upon oxygen ion concentration in said bath.

5. The invention of claim 4 wherein the indicating electrode is an oxide of at least one metal of the group consisting of tin, thorium, chromium and iron and wherein the reference electrode is a member of the group consisting of silver, iron, tungsten and aluminum.

6. A measuring system according to claim 1, wherein the indicating electrode is an oxide of at least one metal of the group consisting of tin, thorium, chromium and iron.

7. A measuring system according to claim 1, wherein the indicating electrode is an oxide of at least one metal of the group consisting of tin, thorium, chromium and iron and the reference electrode is a member of the group consisting of silver, iron, tungsten and aluminum.

8. A method according to claim 2, wherein the indicating electrode is an oxide of at least one metal of the group consisting of tin, thorium, chromium and iron.

9. A method according to claim 2, wherein the indicating electrode is an oxide of at least one metal of the group consisting of tin, thorium, chromium and iron, and the reference electrode is a member of the group consisting of silver, iron, tungsten and aluminum.

10. A method according to claim 3, wherein the indicating electrode is an oxide of at least one metal of the group consisting of tin, thorium, chromium and iron and wherein the reference electrode is a member of the group consisting of silver, iron, tungsten and aluminum.

References Cited in the file of this patent

UNITED STATES PATENTS

| | | |
|---|---|---|
| 1,079,269 | Serger | Nov. 18, 1913 |
| 2,206,026 | Buser | July 2, 1940 |
| 2,215,165 | Sumner | Sept. 17, 1940 |
| 2,289,258 | French | July 7, 1942 |
| 2,319,196 | Anderson | May 18, 1943 |
| 2,827,425 | McGlasson | Mar. 18, 1958 |

OTHER REFERENCES

Marshall et al.: "Jour. of Physical Chemistry," volume 46 (1942), pages 353–358.

Verdieck et al.: "Journal of Physical Chemistry," volume 46 (1942), pages 344–345.